United States Patent
Baier

(10) Patent No.: US 11,703,115 B2
(45) Date of Patent: Jul. 18, 2023

(54) FLEXIBLE TRANSMISSION ELEMENT

(71) Applicant: Schaeffler Technologies AG & Co. KG, Herzogenaurach (DE)

(72) Inventor: Richard Baier, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/590,922

(22) Filed: Feb. 2, 2022

(65) Prior Publication Data

US 2022/0154812 A1 May 19, 2022

Related U.S. Application Data

(62) Division of application No. 16/302,893, filed as application No. PCT/DE2017/100278 on Apr. 7, 2017, now Pat. No. 11,274,737.

(30) Foreign Application Priority Data

May 18, 2016 (DE) .......................... 102016208536.0

(51) Int. Cl.
*F16H 49/00* (2006.01)
*F01L 1/352* (2006.01)

(52) U.S. Cl.
CPC ............ *F16H 49/001* (2013.01); *F01L 1/352* (2013.01); *F01L 2001/3521* (2013.01); *F16H 2049/003* (2013.01)

(58) Field of Classification Search
CPC ............ F16H 49/001; F16H 2049/003; B29C 45/0055

USPC .......................................................... 74/640
See application file for complete search history.

(56) References Cited

U.S. PATENT DOCUMENTS

| 4,619,156 | A | 10/1986 | Kiryu | |
| 5,176,021 | A * | 1/1993 | Jensen | B21D 22/22 |
| | | | | 279/3 |
| 5,862,700 | A | 1/1999 | Klein | |
| 7,845,204 | B2 * | 12/2010 | Smyers | B21D 22/22 |
| | | | | 72/349 |
| 8,646,360 | B2 | 2/2014 | Kanai | |
| 9,156,489 | B2 | 10/2015 | Hebenstreit et al. | |
| 9,328,813 | B2 | 5/2016 | Hoffman et al. | |
| 9,840,947 | B2 | 12/2017 | Kohrs et al. | |
| 9,981,296 | B2 | 5/2018 | Schlayer et al. | |
| 10,449,594 | B2 * | 10/2019 | Hibbs | B21D 22/20 |
| 10,857,582 | B2 * | 12/2020 | Yamagata | B21D 51/12 |
| 2013/0059166 | A1 * | 3/2013 | Nagata | F16D 13/60 |
| | | | | 428/600 |
| 2015/0246384 | A1 * | 9/2015 | Ikeda | B21D 24/04 |
| | | | | 72/347 |

(Continued)

FOREIGN PATENT DOCUMENTS

| CN | 2886215 Y | 4/2007 |
| CN | 101561031 A | 10/2009 |
| CN | 104033565 A | 9/2014 |

(Continued)

*Primary Examiner* — Ha Dinh Ho
(74) *Attorney, Agent, or Firm* — Volpe Koenig

(57) ABSTRACT

A flexible transmission element is disclosed which can be used, in particular in a harmonic drive and which includes a sleeve-shaped, outer toothed section and a flange connected to this section, the outer toothing of the sleeve-shaped section is sheet metal toothing formed in a die.

20 Claims, 4 Drawing Sheets

(56) References Cited

U.S. PATENT DOCUMENTS

2015/0251233 A1\* 9/2015 Schlayer ................ B21D 17/04
                                                          29/893.32

FOREIGN PATENT DOCUMENTS

| | | |
|---|---|---|
| CN | 104105632 A | 10/2014 |
| DE | 2549230 A1 | 9/1976 |
| DE | 29901418 U1 | 6/1999 |
| DE | 19639081 C2 | 6/2003 |
| DE | 102006042216 A1 | 3/2008 |
| DE | 102008038127 B3 | 2/2010 |
| DE | 102013216183 A1 | 2/2015 |
| DE | 102013220220 A1 | 4/2015 |
| DE | 102013221246 A1 | 4/2015 |
| DE | 102014002971 A1 | 9/2015 |
| EP | 0741256 B1 | 11/2000 |
| JP | H07113443 | 5/1995 |
| JP | 2015099322 | 5/2015 |
| WO | 2015156797 A1 | 10/2015 |

\* cited by examiner

FLEXIBLE TRANSMISSION ELEMENT

CROSS REFERENCE TO RELATED APPLICATIONS

This application is a divisional application of U.S. patent application Ser. No. 16/302,893, filed on Nov. 19, 2018, which is incorporated in its entirety by reference as if fully set forth herein.

BACKGROUND

The invention relates to an outer toothed, flexible transmission element that is suitable, in particular, for use in a harmonic drive, and also to a method for producing such a transmission element.

From EP 0 741 256 B1, an elastic gearwheel with outer toothing is known. This gearwheel has the shape of a top hat, also called a collar sleeve. A radially outwardly directed ring-shaped hub in the form of a flange connects to a sleeve-shaped, cylindrical area of the gearwheel. For achieving the desired elastic properties of the gearwheel, different sections of this gearwheel have different thicknesses. The gearwheel is provided for installation in a harmonic drive and should be suitable, in particular, for use in robots.

From DE 10 2013 220 220 A1, a camshaft adjustment device working with a harmonic drive is known. In this case, special precautions are taken for lubricating the harmonic drive, which comprises, depending on the operating principle, a flexible transmission element, in this case, a flexible ring.

Other flexible transmission elements are known from U.S. Pat. No. 9,328,813 B2, DE 10 2013 216 183 A1, and DE 299 01 418 U1.

SUMMARY

The invention is based on the objective of improving a flexible transmission element that is suitable for a harmonic drive compared to the prior art, especially in terms of production technology.

This objective is achieved by a flexible transmission element with one or more features of the invention. The objective is likewise achieved by a method for manufacturing a flexible transmission element using one or more features of the invention. The transmission element produced by the method according to the invention can be a transmission element with all the disclosed features. Alternatively, it could be a transmission element with modified, in particular, simplified, geometry. In connection with the production method, features and advantages of the invention also apply analogously to the device, i.e., the flexible transmission element, and vice versa.

The flexible transmission element has a sleeve-shaped, outer toothed section—for short: sleeve section—that connects to a radially outwardly directed flange. The outer toothing of the sleeve-shaped section is plate toothing. Plate toothing is understood to be toothing formed by non-cutting shaping processes based on a base part made from sheet metal. For the technological background, refer to the documents DE 10 2013 221 246 A1 and DE 10 2006 042 216 A1, each of which shows synchronizing rings with plate teeth.

The plate toothing formed by non-cutting shaping processes for the flexible transmission element can be used without additional processing in a gear drive, in particular, a harmonic drive. The flexible transmission element can be produced as a one-piece sheet-metal part in the following steps:

A hat-shaped unprocessed part is prepared that has a sleeve-shaped section and a flange connecting to this section, wherein the sleeve-shaped section has a radially inwardly directed thicker section on its end side facing away from the flange, Material located in the thicker section is pressed radially outwardly into an inner toothed die, with which outer toothing of the transmission element is shaped.

If a flexible transmission element without a flange is produced, as the first step of the method, an unprocessed part is prepared without a flange, which has a sleeve-shaped section with a radially inwardly directed thicker section, for example, consists exclusively of such a sleeve-shaped section.

The invention starts from the consideration that tooth structures can be produced basically by either cutting methods or non-cutting methods. Parts with inner and outer toothing sections produced without cutting are known, for example, from DE 10 2008 038 127 B3 and from DE 25 49 230 C2. For producing the tooth structures, a tool grips the surface of the workpiece that should receive the tooth structure. Devices suitable for such processing methods are known, in principle, from DE 10 2014 002 971 A1 and DE 196 39 081 C2. In both cases, profiled roller tools are used for processing the workpiece.

In turning away from proven non-cutting processing methods, in accordance with the method according to the invention, a tool, for example, in the form of a profiled roller tool, is not moved relative to the surface of a workpiece to be profiled. Instead, the workpiece to be profiled, namely the flexible transmission element, is held in a non-changing position relative to the tool having the tooth structure, namely the die, during the shaping process, wherein a tool moving relative to the workpiece exerts a pressure load from the inside onto the workpiece outward from the surface that lies opposite the surface to be profiled. The complete, ring-shaped, closed tooth structure of the die is reproduced by the shaping process 1:1 on the workpiece, that is, the transmission element.

The sleeve-shaped section of the unprocessed part preferably has a complete cylindrical outer wall before the shaping process. Accordingly, the die has a section with a complete cylindrical inner periphery, in order to hold the hat-shaped unprocessed part. A section that has teeth connects to the cylindrical section of the die, wherein the teeth are in a ring-shaped area, whose inner diameter matches the diameter of the cylindrical section. This means that the unprocessed part, when it contacts the inner periphery of the cylindrical section of the die, also contacts tips of teeth of the toothed section of the die. The use of the unprocessed part in the die is thus realized without any deformation. While the lateral surface of the cylindrical, sleeve-shaped section has, apart from a transition area to the flange, a uniform diameter, on the inner peripheral surface of the cylindrical section of the unprocessed part, there is a significant diameter reduction that is in the section—viewed in the axial direction of the transmission element—in which the teeth are to be produced.

The unprocessed part that is shaped into the flexible transmission element is preferably a part made from a sheet-metal band, that is, a base band, by a deep drawing process. The thickness of the sheet-metal band is designated as the base band thickness.

The thicker section of the deep-drawn unprocessed part that is shaped in the die preferably has a thickness measured in the radial direction of the unprocessed part, that is, a thickness that is larger, for example, by at least 20% and at most 50% larger, in particular, at least 25% and at most 35% larger, for example, by 30% larger, than the base band thickness.

During the shaping process, the thicker section on the inner side of the sleeve-shaped section of the unprocessed part is preferably forced outward so far that the inner periphery of the final transmission element is completely cylindrical, that is, has a uniform inner diameter. Thus, an outwardly directed toothing is generated by the shaping process from an inwardly directed thicker section, wherein, in the same cycle, a smooth, cylindrical surface on the outside of the sleeve-shaped section disappears and is produced on the inner side of the sleeve-shaped section. The shaping process preferably ends with the final contour of the outer toothing of the flexible transmission element. Thus, reprocessing of the flexible transmission element, which relates to the geometry of the outer toothing, is not required.

In the flange of the flexible transmission element there are openings. Here, at least one part of the openings has an elongated, concavely curved shape with respect to the center axis of the transmission element. The concave curvature means that each of the openings is curved opposite the curvature of the lateral surface of the flexible transmission element. The elongated, concavely curved openings are especially advantageous with respect to the elastic properties of the transmission element. In addition to these openings, the transmission element has optional fastener openings, wherein the elongated openings are arranged to a large extent, with reference to their extent in the peripheral direction of the flange, radially within an associated fastener opening. Viewed in the radial direction of the transmission element, there is preferably an overlap between an elongated opening, especially its widened ends, and the associated, typically circular fastener opening.

The flexible transmission element is suitable, in particular, for use in a harmonic drive that functions as a control gear in an electric camshaft adjuster or in a device for varying the ratio of compression of a reciprocating internal combustion engine. The flexible transmission element is also suitable for use in a stationary drive.

BRIEF DESCRIPTION OF THE DRAWINGS

An embodiment of the invention is explained below in more detail with reference to a drawing. Shown herein are.

DETAILED DESCRIPTION

Figure 1:
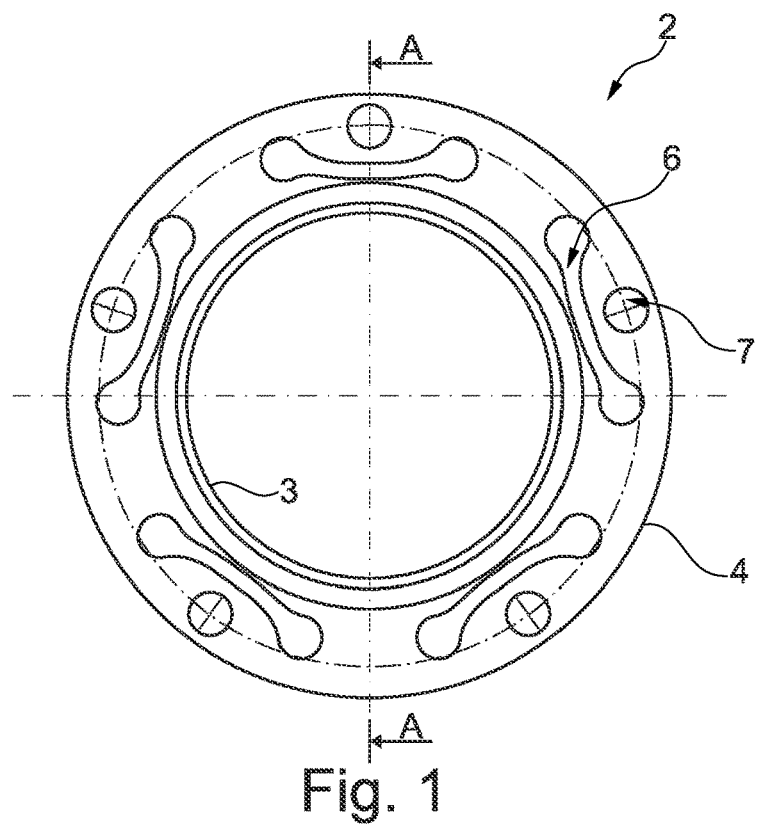
FIG. 1 an unprocessed part provided for producing a flexible transmission element, FIG. 2 a cross section through the unprocessed part according to FIG. 1, FIG. 3 a detail of the unprocessed part according to FIG. 1, FIG. 4 a flexible transmission element produced from the unprocessed part in a view analogous to FIG. 1, FIG. 5 the transmission element according to FIG. 4 in a cross section analogous to FIG. 2, FIG. 6 the flexible transmission in perspective view, and FIG. 7 a harmonic drive with the flexible transmission element.
Figure 2:
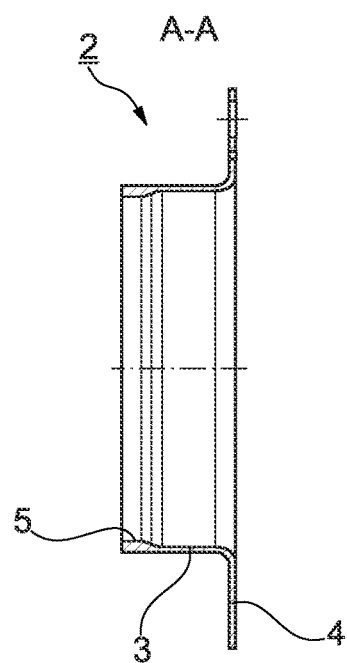
Figure 3:
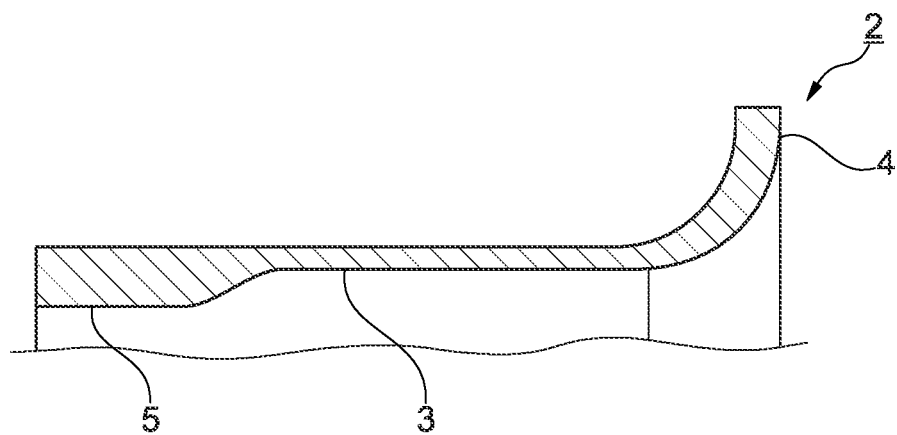
Figure 4:
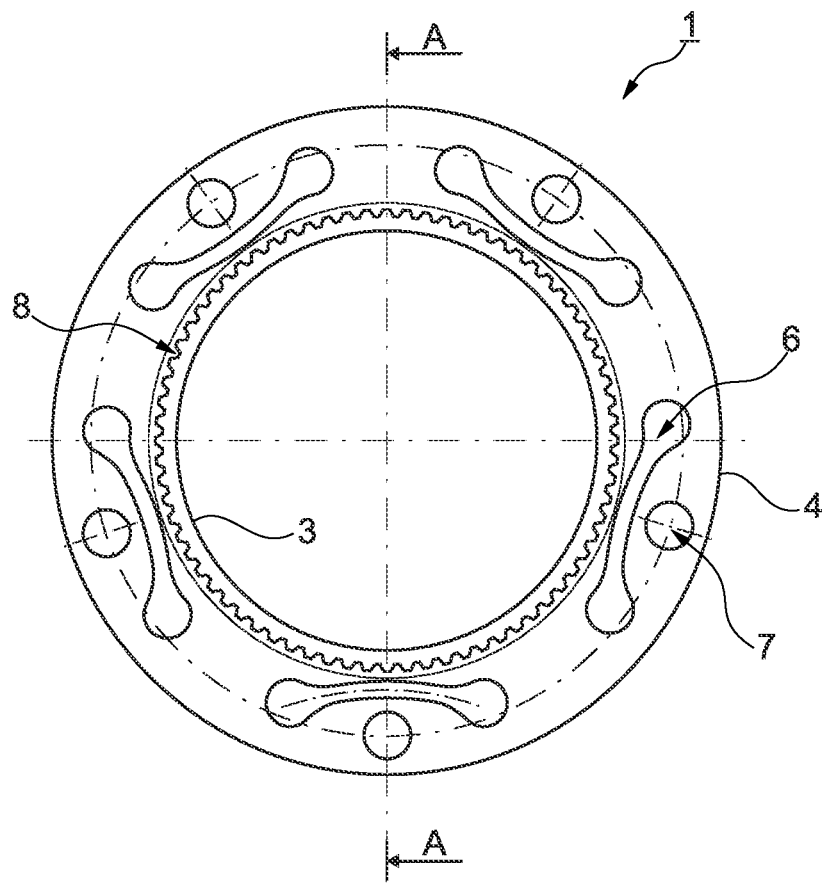
Figure 5:
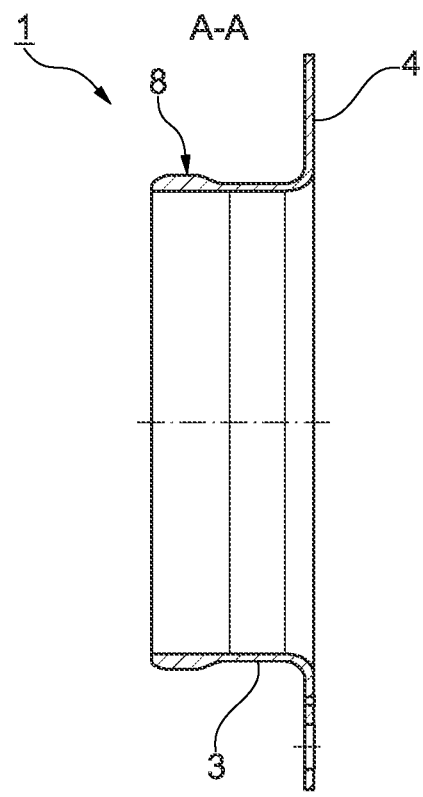
Figure 6:
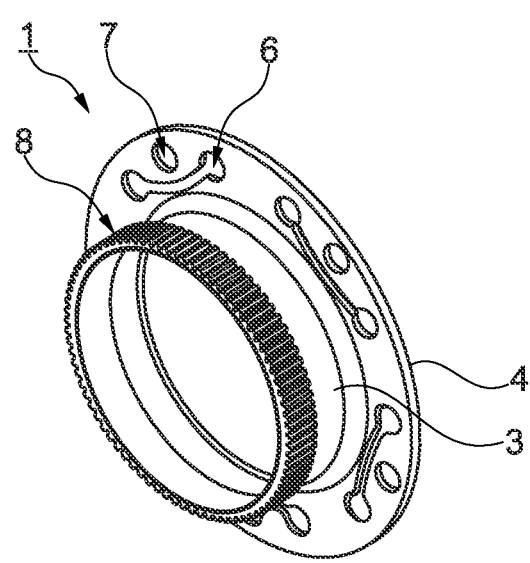

FIGS. 1 to 3 show an unprocessed part 2 that is formed as a sheet metal part and shows the base part for producing a flexible transmission element designated with 1 according to FIGS. 4 to 6. Just like the final transmission element 1, the unprocessed part 2 already has the shape of a hat with a cylindrical sleeve section 3 and a flange 4 directed radially outwardly from this section.

A radially inwardly directed material buildup 5, also called thicker section for short, is located on the end side of the unprocessed part 2 facing away from the flange 4. The outer periphery of the sleeve-shaped section 3, called sleeve section for short, is, in contrast, apart from a transition region to the flange 4, completely cylindrical, that is, has no steps or other changes in the diameter. The smooth, cylindrical sleeve section 3 is inserted into a not-shown die, whose inner periphery is also cylindrical to a large degree in one possible construction. In the same section of the die in which the sleeve section 3 has the material buildup 5 on the inner side, there is a tooth structure in the die that contacts the smooth outer surface of the sleeve section 3.

Then a radially outwardly acting pressure is exerted on the thicker section 5 by a tool that can rotate relative to the unprocessed part 2. This leads to a continuous displacement of the material of the thicker section 5 into the tooth structure of the die.

As a result of this shaping process, outer toothing designated with 8 is formed on the lateral surface of the sleeve section 3. The inner wall of the sleeve section 3 of the flexible transmission element 1 finished in this way is, in contrast, cylindrical. The pressing of the toothing 8 in the die from the inner side of the unprocessed part 2 leads to an enhanced load carrying capacity of the outer toothing 8. The tooth structure of the die is reproduced completely in the outer toothing 8 of the transmission element 1.

The flange 4 of the transmission element 1 has, like the sleeve section 3, an elastic flexibility. The elastic flexibility of the flange 4 is promoted by elongated, curved cut-outs 6 that are distributed uniformly around the periphery of the flange 4. Each cut-out 6, in general also called opening, is located essentially radially inside of a fastener opening 7 that can also be produced, for example, by stamping just like each cut-out 6. The two ends of each cut-out 6 are made wider; the associated fastener opening 7 is located centrally between the two ends of the cut-out 6, wherein, viewed in the radial direction of the flange 4, there is an overlap between the ends of the cut-out 6 and the fastener opening 7. The flexible transmission element 1 thus also has, for tilting loads, a significant elastic flexibility, wherein there is simultaneously a high stiffness in the circumferential direction.

Figure 7:
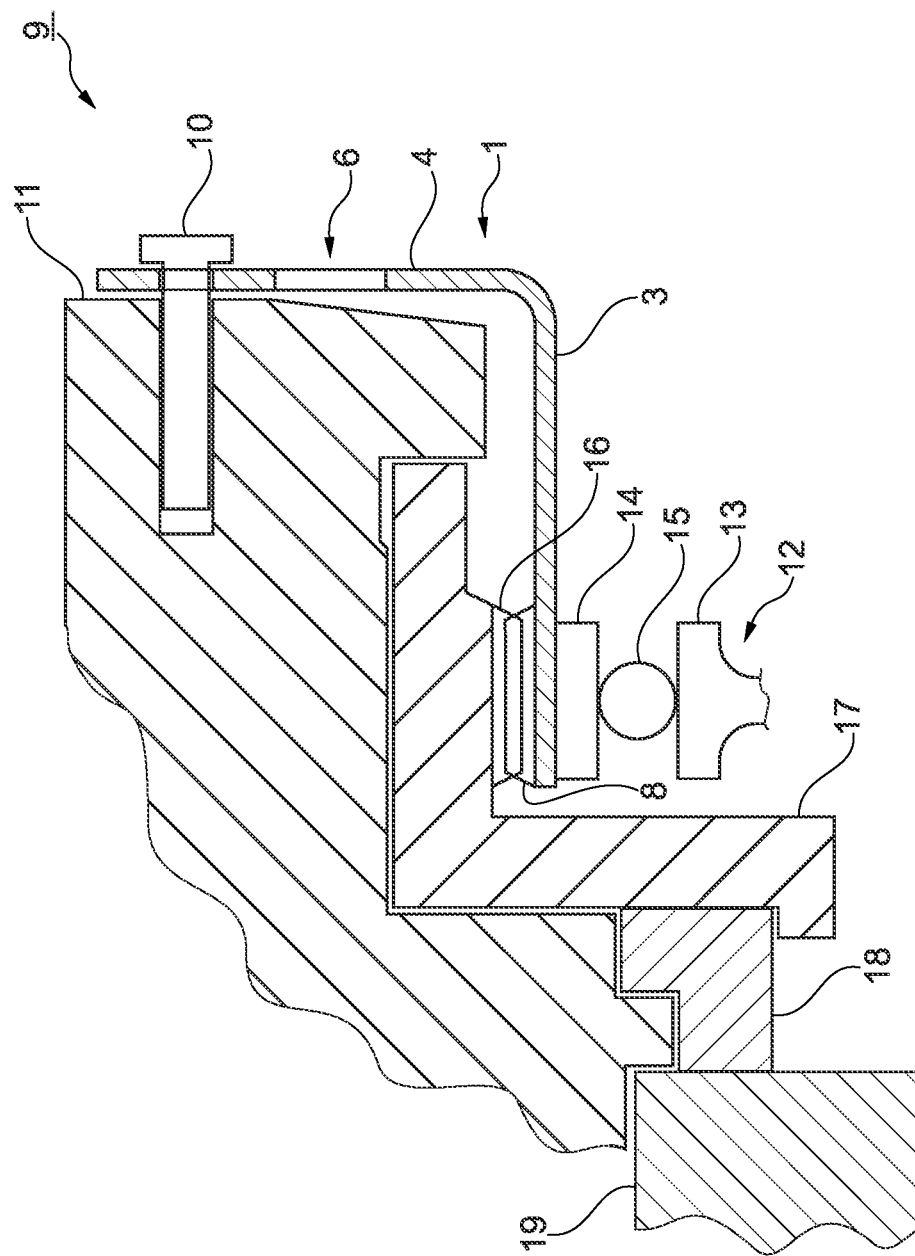

The installation situation of the flexible transmission element 1, that is, the outer toothed collar sleeve, is shown in FIG. 7. The flexible transmission element 1 is a component of a harmonic drive that is designated with 9 and is used as a control gear in a motor vehicle.

With screws 10 that each pass through a fastener opening 7, the flexible transmission element 1 is fastened to a housing 11 that is not allocated to the harmonic drive 9. When the harmonic drive 9 is operating, the sleeve section 3 is continuously deformed by a harmonic generator 12 that has an elliptical inner ring 13, an outer ring 14, and roller bodies 15, namely balls, rolling between the inner ring 13 and the outer ring 14. The outer ring 14 adapting continuously to the elliptical shape of the inner ring 13 is arranged radially directly within the outer toothing 8 of the flexible transmission element. The outer toothing 8 engages two diametrically opposite positions in inner toothing 16 of an inherently rigid driven ring gear 17 of the harmonic drive 9. A slightly different number of teeth of the inner toothing 16 on one side and the outer toothing 8 on the other side ensures that for one complete revolution of the inner ring 13, the driven ring gear 17 is rotated slightly relative to the flexible transmission element 1 and thus also relative to the housing 11. The driven ring gear 17 is connected locked in rotation to a shaft 19, that is, driven shaft, namely eccentric shaft or camshaft, by a stop washer 18. The common rotational axis of the shaft 19 and the harmonic drive 9 that corresponds to the center axis of the flexible transmission element 1, is designated with R.

LIST OF REFERENCE SYMBOLS

1 Flexible transmission element
2 Unprocessed part
3 Sleeve section
4 Flange
5 Material buildup, thicker section
6 Cut-out
7 Fastener opening
8 Outer toothing
9 Harmonic drive
10 Screw
11 Housing
12 Harmonic generator
13 Inner ring
14 Outer ring
15 Roller body
16 Inner toothing
17 Driven ring gear
18 Stop washer
19 Shaft
R Rotational axis, center axis

What is claimed is:

1. A flexible transmission element, comprising:
   a sleeve-shaped, outer toothed section having outer toothing, the outer toothing being formed from sheet-metal;
   a flange connected to said sleeve-shaped, outer toothed section, the flange including a plurality of openings; and
   the plurality of openings includes at least one elongated opening that is concavely curved shape with respect to a center axis of the transmission element, such that the at least one elongated opening is nonconcentric with the center axis.

2. The flexible transmission element according to claim 1, wherein the at least one elongated opening includes a plurality of elongated openings, and the plurality of openings also includes a plurality of fastener openings, wherein each one of the plurality of elongated openings is arranged, with respect to the center axis, at least partially radially aligned with a respective one of the plurality of fastener openings located in the flange.

3. The flexible transmission element according to claim 2, wherein the plurality of fastener openings are arranged radially outward from the plurality of elongated openings.

4. The flexible transmission element according to claim 2, wherein both ends of each said elongated opening are wider than a medial portion of the elongated opening and the medial portion of each said elongated opening overlaps with a respective one of the fastener openings in a radial direction of the flange.

5. The flexible transmission element according to claim 1, wherein the flange extends radially outward from said sleeve-shaped, outer toothed section.

6. The flexible transmission element according to claim 1, wherein an inner surface of said sleeve-shaped, outer toothed section is cylindrical.

7. The flexible transmission element according to claim 1, wherein said sleeve-shaped, outer toothed section is defined on an axial end of the flexible transmission element.

8. A flexible transmission element, comprising:
   a hat-shaped, deep drawn sheet-metal part including a sleeve-shaped section and a radially extending flange located at one axial end;
   outer toothing integrally formed on an opposite end of the sleeve-shaped section from the radially extending flange;
   a plurality of fastener openings in the radially extending flange; and
   a plurality of flex openings in the radially extending flange, the plurality of flex openings each having an elongated, concavely curved shape with respect to a center axis of the transmission element.

9. The flexible transmission element according to claim 8, wherein the plurality of fastener openings and the plurality of flex openings are punched openings.

10. The flexible transmission element according to claim 8, wherein the sleeve-shaped section has a constant inner diameter.

11. The flexible transmission element according to claim 8, wherein the plurality of flex openings are distributed uniformly around a periphery of the radially extending flange.

12. The flexible transmission element according to claim 8, wherein one of the plurality of fastener openings is associated with a respective one of the plurality of flex openings, and each one of the plurality of flex openings is arranged, with respect to the center axis, at least partially radially aligned with a respective one of the plurality of fastener openings.

13. The flexible transmission element according to claim 12, wherein the plurality of flex openings each include enlarged open areas at ends of the elongated, concavely curved shape.

14. The flexible transmission element according to claim 8, wherein the plurality of flex openings are arranged radially inward from the plurality of fastened openings.

15. The flexible transmission element according to claim 8, wherein the radially extending flange extends radially outward.

16. The flexible transmission element according to claim 8, wherein an inner surface of said sleeve-shaped section is cylindrical.

17. A flexible transmission element, comprising:
   a sleeve-shaped, outer toothed section having outer toothing, the outer toothing being formed from sheet-metal;
   a flange connected to said sleeve-shaped, outer toothed section, the flange including a plurality of openings; and
   the plurality of openings includes at least one elongated opening that is concavely curved shape with respect to a center axis of the transmission element, wherein both ends of each said elongated opening are wider than a medial portion of the elongated opening.

18. The flexible transmission element according to claim 17, wherein the at least one elongated opening includes a plurality of elongated openings, and the plurality of openings also includes a plurality of fastener openings, wherein each one of the plurality of elongated openings is arranged, with respect to the center axis, at least partially radially aligned with a respective one of the plurality of fastener openings located in the flange.

19. The flexible transmission element according to claim 18, wherein the plurality of fastener openings are arranged radially outward from the plurality of elongated openings.

20. The flexible transmission element according to claim 18, wherein the medial portion of each said elongated opening overlaps with a respective one of the fastener openings in a radial direction of the flange.

* * * * *